United States Patent
Balasubramanian et al.

(10) Patent No.: US 10,978,096 B2
(45) Date of Patent: Apr. 13, 2021

(54) OPTIMIZED UPLINK OPERATION FOR VOICE OVER LONG-TERM EVOLUTION (VOLTE) AND VOICE OVER NEW RADIO (VONR) LISTEN OR SILENT PERIODS

(71) Applicant: QUALCOMM Incorporated, San Diego, CA (US)

(72) Inventors: Srinivasan Balasubramanian, San Diego, CA (US); Neha Goel, Herndon, VA (US); Ramachandran Subramanian, San Diego, CA (US); Shailesh Maheshwari, San Diego, CA (US); Kirankumar Bhoja Anchan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 176 days.

(21) Appl. No.: 15/960,519

(22) Filed: Apr. 23, 2018

(65) Prior Publication Data
US 2018/0308509 A1 Oct. 25, 2018

Related U.S. Application Data

(60) Provisional application No. 62/490,022, filed on Apr. 25, 2017.

(51) Int. Cl.
*G10L 25/78* (2013.01)
*H04W 4/10* (2009.01)
(Continued)

(52) U.S. Cl.
CPC .............. *G10L 25/78* (2013.01); *G10L 19/20* (2013.01); *H04L 65/1016* (2013.01);
(Continued)

(58) Field of Classification Search
CPC ....... G10L 19/012; G10L 19/18; G10L 19/20; G10L 21/0216; G10L 25/78; G10L 25/84;
(Continued)

(56) References Cited

U.S. PATENT DOCUMENTS 5,539,858 A * 7/1996 Sasaki ................... G10L 19/012
704/200
5,812,965 A * 9/1998 Massaloux ............ G10L 19/012
704/205
(Continued)

FOREIGN PATENT DOCUMENTS

EP 2202726 A1 6/2010

OTHER PUBLICATIONS

H. Kim, "Protection Against Packet Fragmentation Attacks at 6LoWPAN Adaptation Layer," 2008, 2008 International Conference on Convergence and Hybrid Information Technology, Daejeon, 2008, pp. 796-801 (Year: 2008).*

(Continued)

*Primary Examiner* — Eric Yen
(74) *Attorney, Agent, or Firm* — Muncy, Geissler, Olds & Lowe, P.C.

(57) ABSTRACT

Disclosed are techniques for transmitting bundles of silence indicator (SID) frames during a voice call among a plurality of access terminals. In an aspect, a source access terminal detects a transition to a silence state, generates, in response to detection of the transition, at least a first bundle of SID frames, wherein each SID frame of the at least the first bundle of SID frames includes data representing comfort noise to be played at one or more target access terminals of the plurality of access terminals during the silence state, and transmits the at least the first bundle of SID frames to a base station serving the source access terminal. In an aspect, the base station receives the at least the first bundle of SID (Continued)

frames, and periodically forwards SID frames of the at least the first bundle of SID frames to the one or more target access terminals.

18 Claims, 10 Drawing Sheets

(51) Int. Cl.
  *H04W 72/04* (2009.01)
  *G10L 19/20* (2013.01)
  *G10L 19/012* (2013.01)
  *H04L 29/06* (2006.01)
  *H04L 29/08* (2006.01)

(52) U.S. Cl.
  CPC ...... *H04L 65/1059* (2013.01); *H04L 65/1069* (2013.01); *H04L 65/608* (2013.01); *H04L 65/80* (2013.01); *H04L 67/2804* (2013.01); *H04W 4/10* (2013.01); *H04W 72/0413* (2013.01); *G10L 19/012* (2013.01); *G10L 2025/783* (2013.01)

(58) Field of Classification Search
  CPC ........ G10L 2025/935; H04W 72/0413; H04W 4/10; H04L 65/1016; H04L 65/1059; H04L 65/1069; H04L 65/608; H04L 65/80; H04L 67/2804
  See application file for complete search history.

(56) References Cited

U.S. PATENT DOCUMENTS

| | | | | |
|---|---|---|---|---|
| 5,819,218 | A * | 10/1998 | Hayata | G10L 19/012 704/233 |
| 5,960,389 | A * | 9/1999 | Jarvinen | G10L 19/012 704/215 |
| 6,424,938 | B1 * | 7/2002 | Johansson | G10L 25/78 704/216 |
| 6,606,593 | B1 | 8/2003 | Jarvinen et al. | |
| 7,817,677 | B2 * | 10/2010 | Black | H04L 47/29 370/516 |
| 9,258,413 | B1 * | 2/2016 | Sikri | H04W 72/1215 |
| 2002/0064288 | A1 * | 5/2002 | Walker | G10L 21/0208 381/94.7 |
| 2002/0198708 | A1 * | 12/2002 | Zak | G10L 19/012 704/233 |
| 2003/0012149 | A1 * | 1/2003 | Maggenti | H04W 4/10 370/260 |
| 2003/0065508 | A1 * | 4/2003 | Tsuchinaga | G10L 19/173 704/215 |
| 2003/0115045 | A1 * | 6/2003 | Harris | G10L 21/0364 704/214 |
| 2004/0081106 | A1 * | 4/2004 | Bruhn | H04L 5/14 370/276 |
| 2004/0110539 | A1 * | 6/2004 | El-Maleh | G10L 19/173 455/563 |
| 2004/0114687 | A1 * | 6/2004 | Ferris | G10L 19/00 375/240.11 |
| 2005/0055201 | A1 * | 3/2005 | Florencio | G10L 25/87 704/214 |
| 2005/0152341 | A1 * | 7/2005 | Curcio | H04L 65/104 370/352 |
| 2006/0007886 | A1 * | 1/2006 | Lee | H04W 28/06 370/329 |
| 2006/0045139 | A1 * | 3/2006 | Black | H04L 47/10 370/516 |
| 2006/0149536 | A1 * | 7/2006 | Li | G10L 19/012 704/215 |
| 2007/0050189 | A1 * | 3/2007 | Cruz-Zeno | G10L 19/012 704/226 |
| 2007/0110042 | A1 * | 5/2007 | Li | G10L 25/78 370/352 |
| 2007/0248315 | A1 * | 10/2007 | Takeda | G10L 21/04 386/343 |
| 2007/0274338 | A1 * | 11/2007 | Sebire | G10L 19/012 370/466 |
| 2009/0271188 | A1 * | 10/2009 | Agapi | G10L 21/0208 704/233 |
| 2009/0310540 | A1 * | 12/2009 | Barany | H04B 7/2656 370/328 |
| 2011/0077945 | A1 * | 3/2011 | Ojala | G10L 21/04 704/262 |
| 2011/0261708 | A1 * | 10/2011 | Grandhi | H04B 7/0452 370/252 |
| 2011/0273213 | A1 | 11/2011 | Rama | |
| 2011/0306309 | A1 * | 12/2011 | Yabe | H04L 69/04 455/72 |
| 2013/0006622 | A1 * | 1/2013 | Khalil | G10L 19/012 704/233 |
| 2013/0039238 | A1 * | 2/2013 | Santos Barreto | H04W 52/0216 370/311 |
| 2013/0223336 | A1 * | 8/2013 | Lindner | H04L 47/35 370/328 |
| 2013/0246060 | A1 * | 9/2013 | Sugiyama | G10L 21/0208 704/226 |
| 2015/0110103 | A1 * | 4/2015 | Kullangal Sridhara | H04L 47/6255 370/352 |
| 2015/0256613 | A1 * | 9/2015 | Walker | H04L 43/087 709/217 |
| 2015/0351028 | A1 * | 12/2015 | Vallath | H04W 52/0209 370/311 |
| 2016/0035360 | A1 * | 2/2016 | Taddei | G10L 19/24 704/210 |
| 2017/0018273 | A1 * | 1/2017 | Chowdhury | G10L 15/20 |
| 2017/0178661 | A1 * | 6/2017 | Cahill | G10L 15/063 |

OTHER PUBLICATIONS

S. Bruhn, E. Ekudden and K. Hellwig, "Continuous and discontinuous power reduced transmission of speech inactivity for the GSM system,", 1998, IEEE GLOBECOM 1998 (Cat. No. 98CH36250), Sydney, New South Wales, Australia, 1998, pp. 2091-2096 vol. 4 (Year: 1998).*

International Search Report and Written Opinion—PCT/US2018/029322—ISA/EPO—dated Aug. 2, 2018.

* cited by examiner

*LTE EXAMPLE* FIG. 2

OPTIMIZED UPLINK OPERATION FOR VOICE OVER LONG-TERM EVOLUTION (VOLTE) AND VOICE OVER NEW RADIO (VONR) LISTEN OR SILENT PERIODS

CROSS-REFERENCE TO RELATED APPLICATIONS

The present Application for Patent claims the benefit of U.S. Provisional Application No. 62/490,022, entitled "OPTIMIZED UPLINK OPERATION FOR VOICE OVER LONG-TERM EVOLUTION (VOLTE) AND VOICE OVER NEW RADIO (VONR) LISTEN OR SILENT PERIODS," filed Apr. 25, 2017, assigned to the assignee hereof, and expressly incorporated herein by reference in its entirety.

BACKGROUND

1. Field of the Disclosure

Aspects of the disclosure relate to optimized uplink operation for Voice Over Long-Term Evolution (VoLTE) and Voice Over New Radio (VoNR) listen or silent periods.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., LTE or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of transmitting bundles of silence indicator (SID) frames during a voice call among a plurality of access terminals includes detecting, by a source access terminal of the plurality of access terminals, a transition from a talk state to a silence state, in response to detection of the transition, generating, by the source access terminal, at least a first bundle of SID frames, wherein each SID frame of the at least the first bundle of SID frames includes data representing comfort noise to be played at one or more target access terminals of the plurality of access terminals during the silence state, and transmitting, by the source access terminal, the at least the first bundle of SID frames to a base station serving the source access terminal.

In an aspect, a method of receiving bundles of SID frames during a voice call among a plurality of access terminals includes receiving, at a base station serving a source access terminal of the plurality of access terminals, at least a first bundle of SID frames during a silence state of the source access terminal, wherein each SID frame of the at least the first bundle of SID frames includes data representing comfort noise to be played at one or more target access terminals of the plurality of access terminals during the silence state, providing, by the base station, a grant of access to radio resources utilized for the voice call for a transmission periodicity of SID frames of the at least the first bundle of SID frames to prevent the source access terminal from sending a scheduling request to send the first bundle of SID frames, and periodically forwarding, by the base station, SID frames of the at least the first bundle of SID frames to target access terminals of the plurality of access terminals.

In an aspect, an apparatus configured to transmit bundles of SID frames during a voice call among a plurality of access terminals includes a transceiver of a source access terminal of the plurality of access terminals, and at least one processor of the source access terminal configured to: detect a transition from a talk state to a silence state, generate, in response to detection of the transition, at least a first bundle of SID frames, wherein each SID frame of the at least the first bundle of SID frames includes data representing comfort noise to be played at one or more target access terminals of the plurality of access terminals during the silence state, and cause the transceiver to transmit the at least the first bundle of SID frames to a base station serving the source access terminal.

In an aspect, an apparatus configured to receive bundles of SID frames during a voice call among a plurality of access terminals includes a transceiver of a base station serving a source access terminal of the plurality of access terminals, and at least one processor of the base station configured to: receive, from the source access terminal via the transceiver, at least a first bundle of SID frames during a silence state of the source access terminal, wherein each SID frame of the at least the first bundle of SID frames includes data representing comfort noise to be played at one or more target access terminals of the plurality of access terminals during the silence state, cause the transceiver to provide a grant of access to radio resources utilized for the voice call for a transmission periodicity of SID frames of the at least the first bundle of SID frames to prevent the source access terminal from sending a scheduling request to send the first bundle of SID frames, and cause the transceiver to periodically forward SID frames of the at least the first bundle of SID frames to target access terminals of the plurality of access terminals.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Disclosed is a method of transmitting bundles of silence indicator (SID) frames during a voice call among a plurality of access terminals. In an aspect, a source access terminal of the plurality of access terminals detects a transition from a talk state to a silence state. In response to detection of the transition, the source access terminal generates at least a first bundle of SID frames and transmits the first bundle of SID frames to a base station serving the source access terminal. In an aspect, each SID frame of the at least the first bundle of SID frames includes data representing comfort noise to be played at one or more target access terminals of the plurality of access terminals during the silence state. In an aspect, the base station receives the at least the first bundle of SID frames during the silence state of the source access terminal, provides a grant of access to radio resources utilized for the voice call for a transmission periodicity of SID frames (e.g., 160 ms) of the at least the first bundle of SID frames to prevent the source access terminal from sending a scheduling request to send the first bundle of SID frames These and other aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
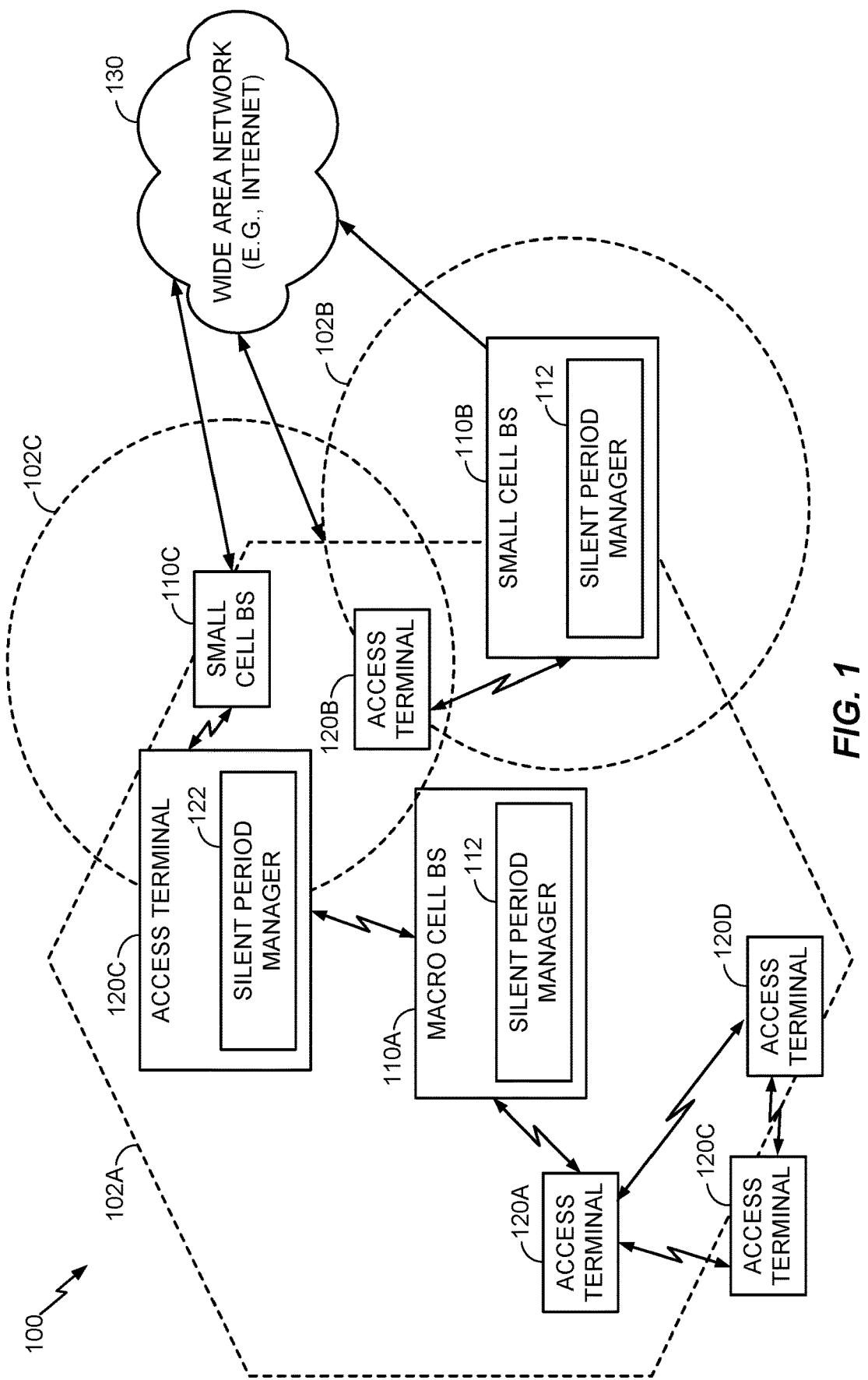
FIG. 1 illustrates an example mixed-deployment wireless communication system including macro cell base stations and small cell base stations.

FIG. 1 illustrates an example mixed-deployment wireless communication system, in which small cell base stations are deployed in conjunction with and to supplement the coverage of macro cell base stations. As used herein, the term "small cell" generally refers to a class of low-powered access points that may include or be otherwise referred to as femto cells, pico cells, micro cells, Wi-Fi access points, other small coverage area base stations, etc. Small cells may be deployed to supplement macro cell coverage, which may cover a few blocks within a neighborhood or several square miles in a rural environment, thereby leading to improved signaling, incremental capacity growth, richer user experience, and so on. Small cells often communicate on unlicensed frequency bands, as opposed to macro cells, which communicate on licensed frequency bands. For example, small cells may use spectrum sharing technologies such as LTE Unlicensed (LTE-U), Licensed-Assisted Access (LAA), LTE Wi-Fi Link Aggregation, (LWA), Citizen Broadband Radio Service (CBRS), Licensed Shared Access (LSA), and MulteFire.

The illustrated wireless communication system 100 is a multiple-access system that is divided into a plurality of cells 102 and configured to support communication for a number of users. Communication coverage in each of the cells 102 is provided by a corresponding base station 110, which interacts with one or more access terminals 120 via DownLink (DL) (e.g., a paging channel, a control channel, a broadcast channel, a forward traffic channel, etc.) and/or UpLink (UL) (e.g., a reverse traffic channel, a reverse control channel, an access channel, etc.) connections. In general, the DL corresponds to communication from a base station to an access terminal, while the UL corresponds to communication from an access terminal to a base station.

As will be described in more detail below, these different entities may be variously configured in accordance with the teachings herein to provide or otherwise support the optimized uplink operation for Voice Over Long-Term Evolution (VoLTE) and Voice Over New Radio (VoNR) listen or silent periods discussed briefly above. For example, one or more of the small cell base stations 110 may include a silence period manager 112, while one or more of the access terminals 120 may include a silence period manager 122.

As used herein, the terms "access terminal" and "base station" are not intended to be specific or otherwise limited to any particular Radio Access Technology (RAT), unless otherwise noted. In general, such access terminals may be any wireless communication device (e.g., a mobile phone, router, personal computer, server, etc.) used by a user to communicate over a communications network, and may be alternatively referred to in different RAT environments as a user device, a mobile device, a Mobile Station (MS), a Subscriber Station (STA), a User Equipment (UE), etc. Similarly, a base station may operate according to one of several RATs in communication with access terminals depending on the network in which it is deployed, and may be alternatively referred to as an Access Point (AP), a Network Node, a NodeB, an evolved NodeB (eNB), etc. In addition, in some systems a base station may provide purely edge node signaling functions while in other systems it may provide additional control and/or network management functions.

Returning to FIG. 1, the different base stations 110 include an example macro cell base station 110A and two example small cell base stations 110B, 110C. The macro cell base station 110A may be configured to provide communication coverage within a macro cell coverage area, i.e., cell 102A, which may cover a few blocks within a neighborhood or several square miles in a rural environment. Meanwhile, the small cell base stations 110B, 110C may be configured to provide communication coverage within respective small cell coverage areas, i.e., cells 102B, 102C, with varying degrees of overlap existing among the different coverage areas/cells. In some systems, each cell 102 may be further divided into one or more (e.g., three) sectors (not shown). Note that in some systems, the multiple "sectors" served by a single base station are also referred to as "cells."

Turning to the illustrated connections in more detail, the access terminal 120A may transmit and receive messages via a wireless link with the macro cell base station 110A, the message including information related to various types of communication (e.g., voice, data, multimedia services, associated control signaling, etc.). The access terminal 120B may similarly communicate with the small cell base station 110B via another wireless link, and the access terminal 120C may similarly communicate with the small cell base station 110C via another wireless link. In addition, in some scenarios, the access terminal 120C, for example, may also communicate with the macro cell base station 110A via a separate wireless link in addition to the wireless link it maintains with the small cell base station 110C.

A communication link through which access terminals can send signals to other access terminals is called a peer-to-peer (P2P) or device-to-device (D2D) channel With reference to FIG. 1, access terminals 120A, 120C, and 120D are depicted as part of a D2D network, or D2D group, with access terminal 120A being connected to the macro cell base station 110A. In an aspect, access terminals 120C and 120D may gain indirect access to the macro cell base station 110A via mediation by access terminal 120A, whereby data "hops" to/from access terminal 120C and/or access terminal 120D and access terminal 120A, which communicate with the macro cell base station 110A on behalf of access terminal 120C and/or access terminal 120D.

As is further illustrated in FIG. 1, the macro cell base station 110A may communicate with a corresponding wide area or external network 130, via a wired link or via a wireless link, while the small cell base stations 110B and 110C may also similarly communicate with the wide area network 130, via their own wired or wireless links. For example, the small cell base stations 110B, 110C may communicate with the wide area network 130 by way of an Internet Protocol (IP) connection, such as via a Digital Subscriber Line (DSL, e.g., including Asymmetric DSL (ADSL), High Data Rate DSL (HDSL), Very High Speed DSL (VDSL), etc.), a TV cable carrying IP traffic, a Broadband over Power Line (BPL) connection, an Optical Fiber (OF) cable, a satellite link, or some other link.

The wide area network 130 may comprise any type of electronically connected group of computers and/or devices, including, for example, Internet, Intranet, Local Area Networks (LANs), or Wide Area Networks (WANs). In addition, the connectivity to the network may be, for example, by remote modem, Ethernet (IEEE 802.3), Token Ring (IEEE 802.5), Fiber Distributed Datalink Interface (FDDI) Asynchronous Transfer Mode (ATM), Wireless Ethernet (IEEE 802.11), Bluetooth (IEEE 802.15.1), or some other connection. As used herein, the wide area network 130 includes network variations such as the public Internet, a private network within the Internet, a secure network within the Internet, a private network, a public network, a value-added network, an intranet, and the like. In certain systems, the wide area network 130 may also comprise a Virtual Private Network (VPN).

Accordingly, it will be appreciated that the macro cell base station 110A and/or either or both of the small cell base stations 110B and 110C may be connected to the wide area network 130 using any of a multitude of devices or methods. These connections may be referred to as the "backbone" or the "backhaul" of the network, and may, in some implementations, be used to manage and coordinate communications between the macro cell base station 110A, the small cell base station 110B, and/or the small cell base station 110C. In this way, as an access terminal 120 moves through such a mixed communication network environment that provides both macro cell and small cell coverage, the access terminal 120 may be served in certain locations by macro cell base stations, at other locations by small cell base stations, and, in some scenarios, by both macro cell and small cell base stations. In an aspect, the various base stations 110 may be referred to as the Radio Access Network (RAN), and the backhaul connections to the wide area network 130 may be referred to as the "core network."

For their wireless air interfaces, each base station 110 may operate according to one of several RATs depending on the network in which it is deployed. These networks may include, for example, 5G millimeter wave (mmWave), Multiple Input, Multiple Output (MIMO), Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. The terms "network" and "system" are often used interchangeably. A CDMA network may implement an RAT such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a RAT such as Global System for Mobile Communications (GSM). An OFDMA network may implement a RAT such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). cdma2000 is described in documents from an organization named "3rd Generation Partnership Project 2" (3GPP2). These documents are publicly available.

A fifth generation (5G) mobile standard, referred to herein as "5G," "5G New Radio," or "5G NR," calls for higher data transfer speeds, greater numbers of connections, and better coverage, among other improvements. 5G NR radio access can be configured to utilize existing LTE infrastructure for mobility management (referred to as a non-standalone mode) or to operate stand-alone with a new multi-access 5G NextGen Core Network (NGCN). 5G is a unifying network concept that provides connectivity across diverse spectrum bands and radio access types. 5G expands spectrum usage to low-bands below 1 GHz, mid-bands between 1 GHz and 6 GHz, and high-bands generally above 24 GHz, (e.g., 5G mmWave). 5G also allows for access to licensed spectrum, shared spectrum, and unlicensed spectrum. As such, the discussion above with reference to FIG. 1, including systems using licensed spectrum, shared spectrum, and unlicensed spectrum, is equally applicable to both 4G LTE and 5G NR. Further, if voice communications (e.g., Voice over IP (VoIP)) are provided over multiple spectrum and radio access types, the efficient use of uplink bandwidth during a Listen/Silence period, as described herein, is relevant for each.

Figure 2:
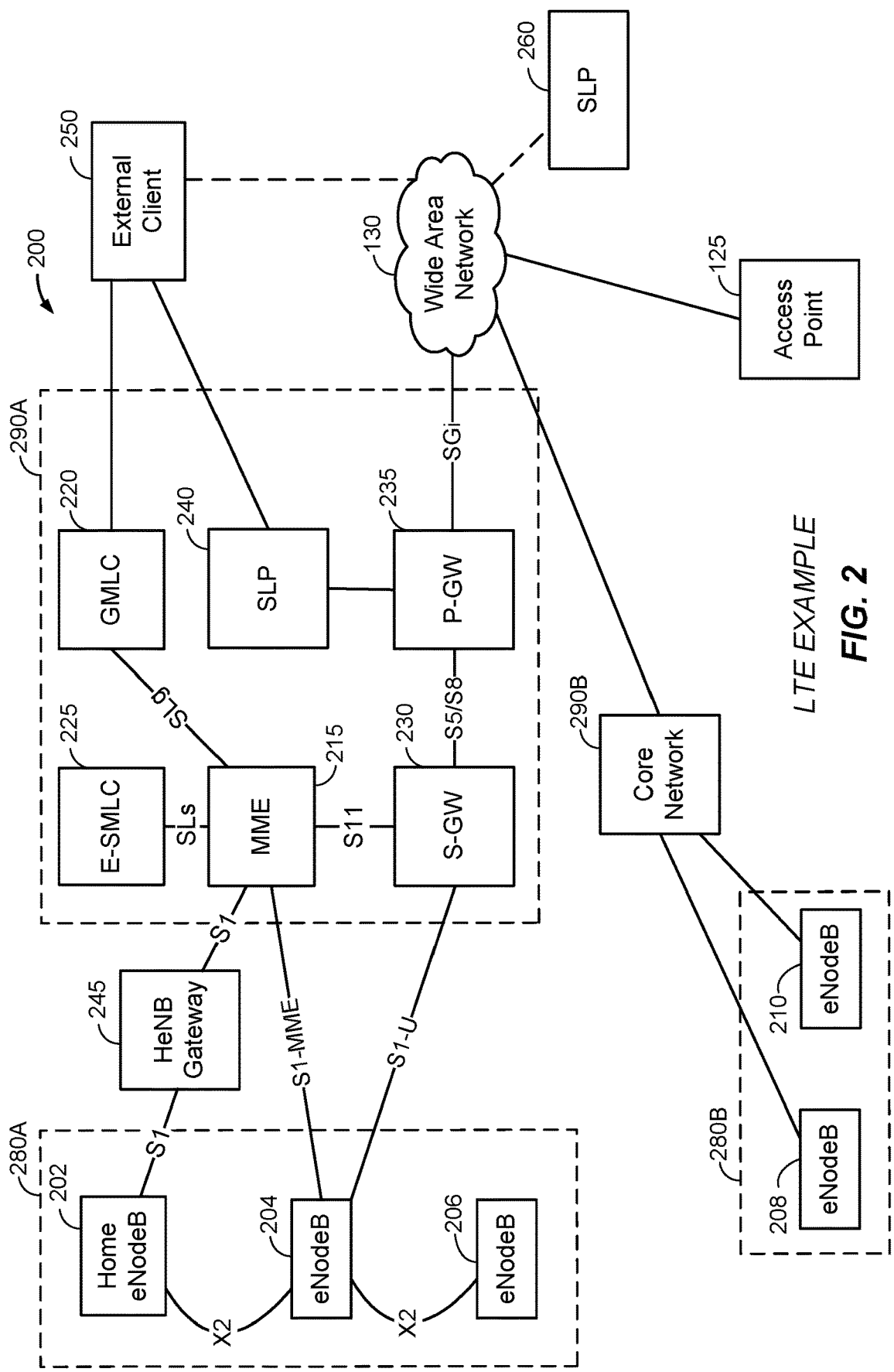
FIG. 2 illustrates an example configuration of radio access networks (RANs) and a packet-switched portion of a core network that is based on a Long Term Evolution (LTE) network in accordance with an aspect of the disclosure.

Because 5G NR radio may utilize existing LTE infrastructure, FIG. 2 illustrates an example wireless communication system 200 having RANs and a packet-switched portion of a core network that is based on an LTE network in accordance with an aspect of the disclosure. In particular, the components of the RANs 280A and 280B and the core networks 290A and 290B correspond to components associated with supporting packet-switched (PS) communications, whereby legacy circuit-switched (CS) components may also be present in these networks, but any legacy CS-specific components are not shown explicitly in FIG. 2.

Referring to FIG. 2, RAN 280A is configured with a plurality of Evolved Node Bs (eNodeBs or eNBs) 202, 202, and 206, and RAN 280B is configured with a plurality of eNodeBs 208 and 210. In the example of FIG. 2, eNodeB 202 is a Home eNodeB (HeNB) and interfaces with the RAN 280A via a HeNB gateway 245. The eNodeBs 204-210 are examples of macro cell base stations (e.g., macro cell base station 110A), while the Home eNodeB 202 is an example of a small cell base station (e.g., small cell base station 110B, 110C). For simplicity, access terminals (e.g., access terminals 120), referred to as UEs in LTE, are not illustrated in FIG. 2.

In FIG. 2, the core network 290A includes an Evolved Serving Mobile Location Center (E-SMLC) 225, a Mobility Management Entity (MME) 215, a Gateway Mobile Location Center (GMLC) 220, a Serving Gateway (S-GW) 230, a Packet Data Network Gateway (P-GW) 235, and a SLP 240. Although not illustrated in FIG. 2 for the sake of simplicity, core network 290B may include the same or similar network entities. In the example of FIG. 2, one or more of the E-SMLC 225, the GMLC 220, the SLP 240, or the SLP 160 may correspond to a "location server" for providing positioning services for access terminals in the wireless communications system 200.

Network interfaces between the components of the core network 290A, the RAN 280A, and the wide area network 130 are illustrated in FIG. 2 and are defined in Table 1 (below) as follows:

TABLE 1

LTE Core Network Connection Definitions

| Network Interface | Description |
|---|---|
| S1-MME | Reference point for the control plane protocol between RAN 280A and MME 215. |
| S1-U | Reference point between RAN 280A and S-GW 230 for the per bearer user plane tunneling and inter-eNodeB path switching during handover. |
| S5 | Provides user plane tunneling and tunnel management between S-GW 230 and P-GW 235. It is used for S-GW relocation due to access terminal mobility and if the S-GW 230 needs to connect to a non-collocated P-GW for the required PDN connectivity. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S11 | Reference point between MME 215 and S-GW 230. |
| SGi | Reference point between the P-GW 235 and the packet data network, shown in FIG. 2 as the wide area network 130. The PDN may be an operator external public or private packet data network or an intra-operator packet data network (e.g., for provision of IMS services). This reference point corresponds to Gi for 3GPP accesses. |
| X2 | Reference point between two different eNodeBs used for access terminal handoffs. |

A high-level description of some of the components shown in the RANs 280A and 280B and the core network 290A of FIG. 2 will now be described. However, these components are each well-known in the art from various 3GPP technical specification (TS) standards, and the description contained herein is not intended to be an exhaustive description of all functionalities performed by these components.

Referring to FIG. 2, the MME 215 is configured to manage the control plane signaling for the Evolved Packet System (EPS) bearers. MME functions include: Non-Access Stratum (NAS) signaling, NAS signaling security, Mobility management for inter- and intra-technology handovers, P-GW and S-GW selection, and MME selection for handovers with MME change.

The S-GW 230 is the gateway that terminates the interface toward the RAN 280A. For each access terminal associated with the core network for an LTE-based system, at a given point of time, there is a single S-GW. The functions of the S-GW 230, for both the GTP-based and the Proxy Mobile IPv6 (PMIP)-based S5/S8, include: Mobility anchor point, Packet routing and forwarding, and setting the DiffServ Code Point (DSCP) based on a QoS Class Identifier (QCI) of the associated EPS bearer.

The P-GW 235 is the gateway that terminates the SGi interface toward the Packet Data Network (PDN), e.g., the wide area network 130. If an access terminal is accessing multiple PDNs, there may be more than one P-GW for that access terminal; however, a mix of S5/S8 connectivity and Gn/Gp connectivity is not typically supported for that access terminal simultaneously. P-GW functions include for both the GTP-based S5/S8: Packet filtering (by deep packet inspection), access terminal IP address allocation, setting the DSCP based on the QCI of the associated EPS bearer, accounting for inter operator charging, UL and DL bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only access terminals and E-UTRAN-capable access terminals using any of E-UTRAN, GERAN, or UTRAN. The P-GW 235D provides PDN connectivity to E-UTRAN capable access terminals using E-UTRAN only over the S5/S8 interface.

As further illustrated in FIG. 2, an external client 250 may be connected to the core network 290A via the GMLC 220 and/or the SLP 240. The external client 250 may optionally be connected to the core network 290B and/or the SLP 260 via the wide area network 130.

Figure 3:
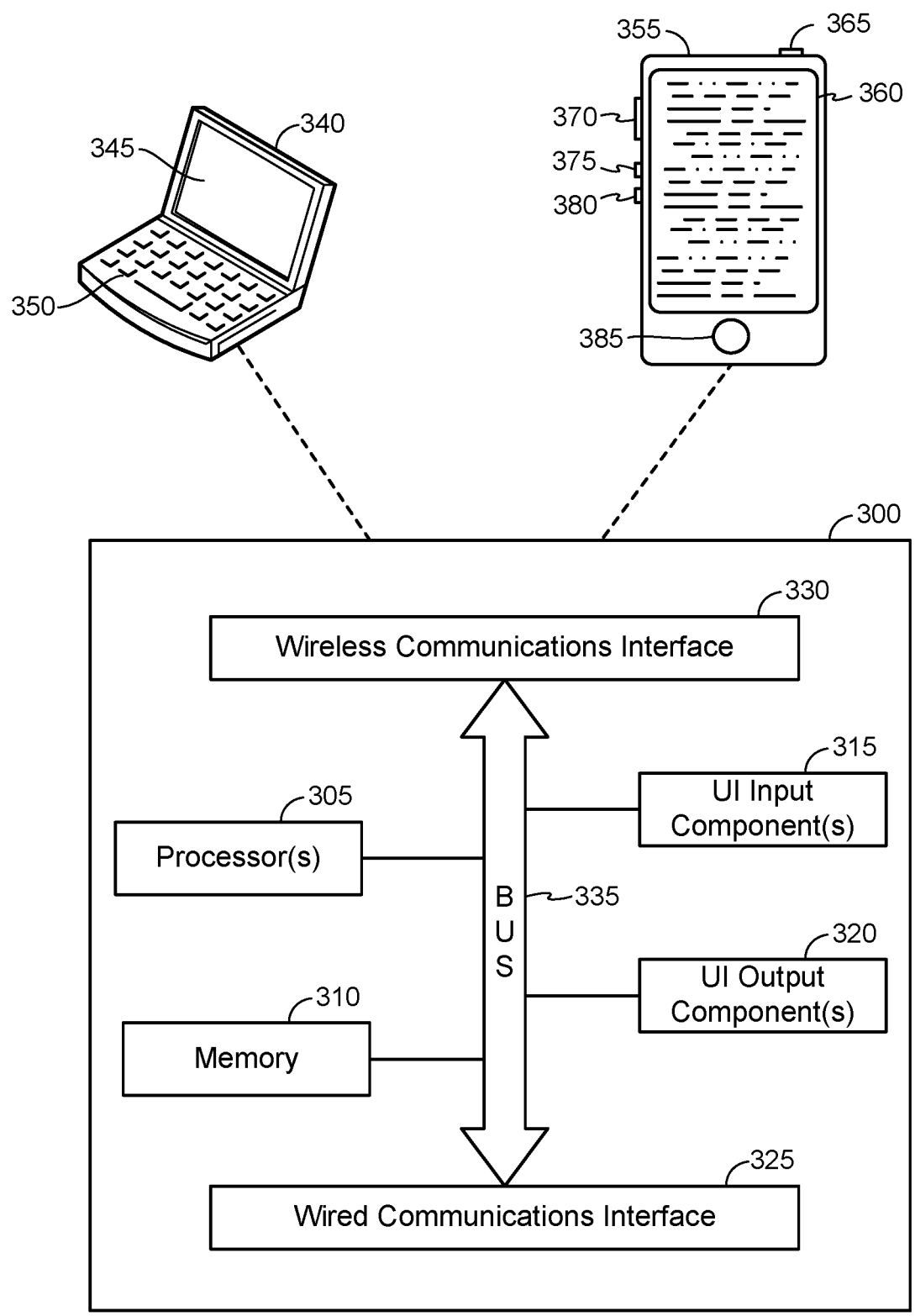
FIG. 3 illustrates an access terminal in accordance with an aspect of the disclosure.

FIG. 3 illustrates an access terminal 300 in accordance with an aspect of the disclosure. The access terminal 300 may correspond to any of access terminals 120 in FIG. 1 or any access terminal in the wireless communication system 200 of FIG. 2 (not shown). In an aspect, the access terminal 300 includes one or more processors 305 (e.g., one or more ASICs, one or more digital signal processors (DSPs), a multicore processor, one or more communication controllers, etc.) and a memory 310 (e.g., Random Access Memory (RAM), Read-Only Memory (ROM), Electrically Erasable Programmable ROM (EEPROM), flash cards, or any memory common to computer platforms). The access terminal 300 also includes one or more user interface (UI) input components 315 (e.g., a keyboard and mouse, a touchscreen, a microphone, one or more buttons such as volume or power buttons, etc.) and one or more UI output components 320 (e.g., speakers, a display screen, a vibration device for vibrating the access terminal 300, etc.).

The access terminal 300 further includes a wired communications interface 325 and a wireless communications interface 330. In an example aspect, the wired communications interface 325 can be used to support wired local connections to peripheral devices (e.g., a Universal Serial Bus (USB) connection, a mini USB or Lightning connection, a headphone jack, a graphics port, such as serial, Video Graphics Array (VGA), High-Definition Multimedia Interface (HDMI), Digital Visual Interface (DVI), or DisplayPort, audio ports, and so on) and/or to a wired access network (e.g., via an Ethernet cable or another type of cable that can function as a bridge to the wired access network such as HDMI v1.4 or higher, etc.). In another example aspect, the wireless communications interface 330 includes one or more wireless transceivers for communication in accordance with a local wireless communications protocol (e.g., Wireless Local Area Network (WLAN) or WiFi, WiFi Direct, LTE-Direct, Bluetooth, etc.). The wireless communications interface 325 may also include one or more wireless transceivers for communication with a cellular RAN (e.g., via CDMA, W-CDMA, TDMA, FDMA, OFDM, GSM, or other protocols that may be used in a wireless communications network or a data communications network). The various components 305-330 of the access terminal 300 can communicate with each other via a bus 335.

Referring to FIG. 3, the access terminal 300 may correspond to any type of access terminal, including but not limited to a smart phone, a laptop computer, a desktop computer, a tablet computer, a wearable device (e.g., a pedometer, a smart watch, etc.) and so on. Two particular implementation examples of the access terminal 300 are depicted in FIG. 3, which are illustrated as laptop 340 and touchscreen device 355 (e.g., a smart phone, a tablet computer, etc.). The laptop 340 includes a display screen 345 and a UI area 350 (e.g., keyboard, touchpad, power button, etc.), and while not shown, the laptop 340 may include various ports as well as wired and/or wireless transceivers (e.g., Ethernet card, WiFi card, broadband card, etc.).

The touchscreen device 355 is configured with a touchscreen display 360, peripheral buttons 365, 370, 375, and 380 (e.g., a power control button, a volume or vibrate control button, an airplane mode toggle button, etc.), and at least one front-panel button 385 (e.g., a Home button, etc.), among other components, as is known in the art. While not shown explicitly as part of the touchscreen device 355, the touchscreen device 355 can include one or more external antennas and/or one or more integrated antennas that are built into the external casing of the touchscreen device 355, including but not limited to WiFi antennas, cellular antennas, satellite position system (SPS) antennas (e.g., global positioning system (GPS) antennas), and so on.

The access terminal 300 may also include the silence period manager 122. Although the silence period manager 122 is illustrated as connected to the bus 335, the silence period manager 122 may be a software module stored in the memory 310 and executable by one or more of processor(s) 305, a separate hardware circuit coupled to the bus 335, a sub-component of one or more of processor(s) 305, a combination of hardware and software, or the like.

In an aspect, the silence period manager 122 may perform, or execution of the silence period manager 122 may cause the access terminal 300 to perform, the operations described herein. Thus, for example, the processor(s) 305, the memory 310, the wireless communications interface 330, the wired communications interface 325, and/or the silence period manager 122 may all be used cooperatively to load, store, and execute the various operations disclosed herein, and as such, the logic to perform these operations may be distributed over various elements. Alternatively, the functionality could be incorporated into one discrete component (e.g., the silence period manager 122). Therefore, the features of the access terminal 300 are to be considered merely illustrative and the disclosure is not limited to the illustrated features or arrangement.

For example, where the access terminal 300 is configured to transmit bundles of SID frames during a voice call among a plurality of access terminals 300, the processor(s) 305 and/or the wireless communications interface 330, based on execution of the silence period manager 122, may be configured to detect a transition from a talk state to a silence state, generate, in response to detection of the transition, at least a first bundle of SID frames, and cause the wireless communications interface 330 to transmit the at least the first bundle of SID frames to a base station serving the source access terminal 300.

Figure 4:
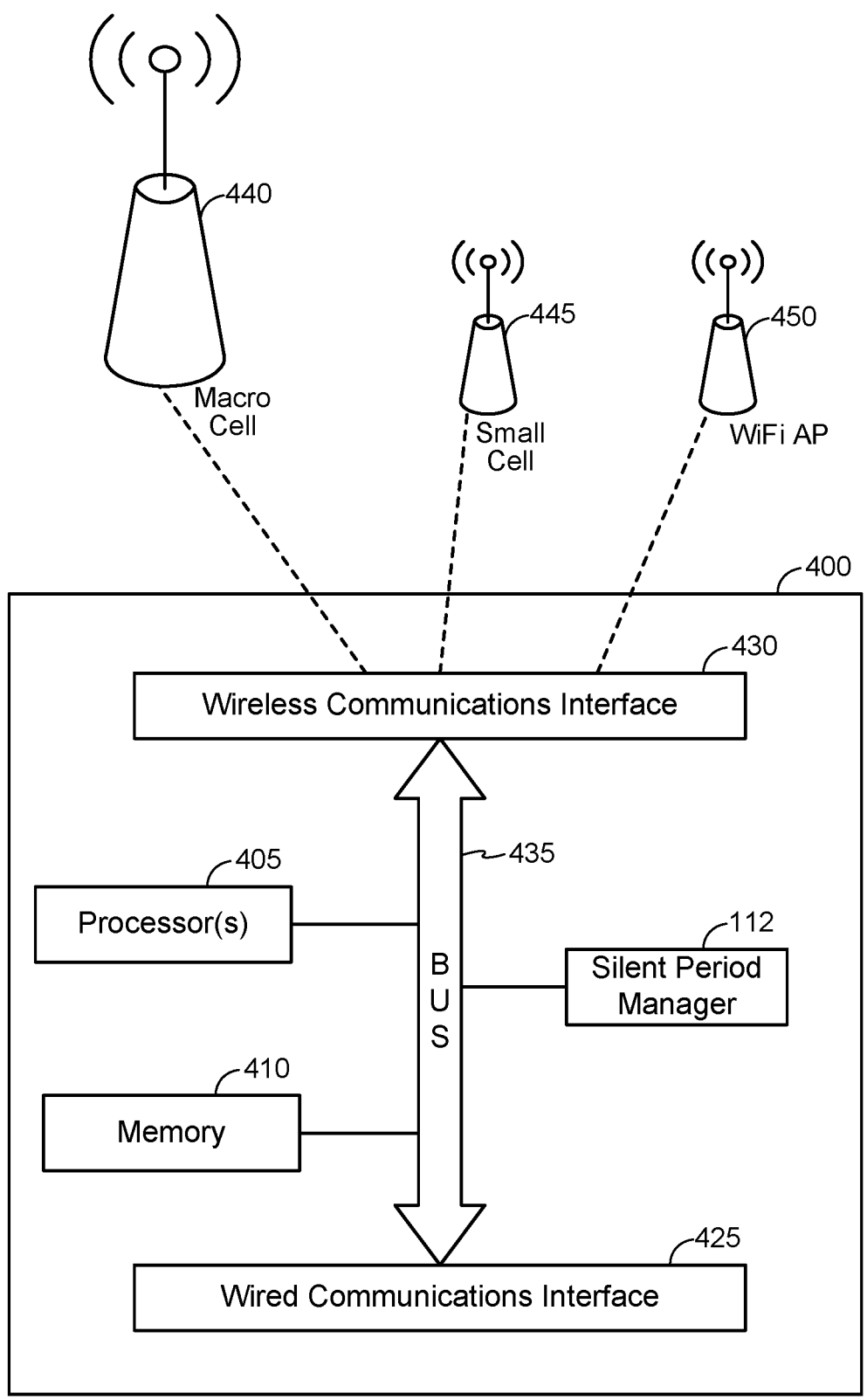
FIG. 4 illustrates an access point in accordance with an aspect of the disclosure.

FIG. 4 illustrates a base station 400 in accordance with an aspect of the disclosure. The base station 400 includes one or more processors 405 (e.g., one or more ASICs, one or more DSPs, a multicore processor, one or more communication controllers, etc.) and a memory 410 (e.g., RAM, ROM, EEPROM, flash cards, or any memory common to computer platforms). The base station 400 further includes a wired communications interface 425 and a wireless communications interface 430. The various components 405-430 of the base station 400 can communicate with each other via a bus 435.

In an example aspect, the wired communications interface 425 can be used to connect to one or more backhaul components. Depending on the network infrastructure where the base station 400 is deployed, the one or more backhaul components to which the base station 400 is connected via the wired communications interface 425 may include a base station controller (BSC), a radio network controller (RNC), other base stations (e.g., other Node Bs via X2 connections as defined by LTE), core network components such as an S-GW or a mobility management entity (MME), and so on, some examples of which are illustrated in FIG. 2.

In another example aspect, the wireless communications interface 430 includes one or more wireless transceivers for communication in accordance with a wireless communications protocol. The wireless communications protocol may be based on the configuration of the base station 400. For example, if the base station 400 is implemented as a macro cell base station 440 (which may correspond to macro cell base station 110A in FIG. 1 and eNodeBs 204-210 in FIG. 2) or a small cell base station 445 (which may correspond to small cell base stations 110B and 110C in FIG. 1 and eNodeB 202 in FIG. 2), the wireless communications interface 430 may include one or more wireless transceivers configured to implement a cellular protocol (e.g., CDMA, W-CDMA, GSM, 3G, 4G, 5G, etc.). In another example, if the base station 400 is implemented as WLAN access point 450, the wireless communications interface 430 may include one or more wireless transceivers configured to implement a WiFi (or 802.11) protocol (e.g., 802.11a, 802.11b, 802.11g, 802.11n, etc.).

The base station 400 may also include the silence period manager 112. Although the silence period manager 112 is illustrated as connected to the bus 435, the silence period manager 112 may be a software module stored in the memory 410 and executable by one or more of processor(s) 405, a separate hardware circuit coupled to the bus 435, a sub-component of one or more of processor(s) 405, a combination of hardware and software, or the like.

In an aspect, the silence period manager 112 may perform, or execution of the silence period manager 112 may cause the base station 400 to perform, the operations described herein. Thus, for example, the processor(s) 405, the memory 410, the wireless communications interface 430, the wired communications interface 425, and/or the silence period manager 112 may all be used cooperatively to load, store, and execute the various operations disclosed herein, and as such, the logic to perform these operations may be distributed over various elements. Alternatively, the functionality could be incorporated into one discrete component (e.g., the silence period manager 112). Therefore, the features of the base station 400 are to be considered merely illustrative and the disclosure is not limited to the illustrated features or arrangement.

For example, where the base station 400 is configured to receive bundles of SID frames during a voice call among a plurality of access terminals 300, the processor(s) 405 and/or the wireless communications interface 430, based on executing the silence period manager 112, may be configured to receive, from a source access terminal 300 of the plurality of access terminals 300, via the wireless communications interface 430, at least a first bundle of SID frames during a silence state of the source access terminal 300, provide a grant of access to radio resources utilized for the voice call for a transmission periodicity of SID frames of the at least the first bundle of SID frames to prevent the source access terminal 300 from sending a scheduling request to send the first bundle of SID frames, and periodically forward, via the wireless communications interface 430, SID frames of the at least the first bundle of SID frames to target access terminals 300 of the plurality of access terminals 300.

VoIP is a methodology for the delivery of voice communications and multimedia sessions over IP networks, such as the Internet (e.g., illustrated as the wide area network 130 in FIGS. 1 and 2). VoIP is the provisioning of communications services (e.g., voice, fax, Short Message Service (SMS), Multimedia Message Service (MMS), voice-messaging, etc.) over a packet-switched network, such as the Internet, rather than over a circuit-switched network, such as the public switched telephone network (PSTN).

The steps involved in originating VoIP telephone calls involve signaling, channel setup, digitization of the analog voice signals, and encoding. Instead of being transmitted over a circuit-switched network, however, the digital information is packetized, and transmission occurs as IP packets over the packet-switched network (e.g., core network 290 in FIG. 2).

VoLTE is a type of VoIP using an LTE network. LTE is a data-only networking technology, and thus, does not support traditional voice-call technology (e.g., circuit-switched calls). As such, in order to support voice calls, VoLTE, as a type of VoIP, treats voice calls as packet data that can be carried on a data network. VoNR is also a type of VoIP but operates over a 5G network (whether standalone, e.g., NGCN, or non-standalone, e.g., utilizing existing LTE infrastructure).

Upon detecting a period of voice inactivity on a VoIP call (referred to as a Listen/Silence period), the access terminal (e.g., access terminal 120) sends Silence Indicator (SID) packets on the uplink in place of encoded speech frames. The access terminal may send a few SID packets back-to-back as it enters the Listen/Silence state and then may send a SID packet once every 160 ms, for example, until the next talk period begins.

The access terminal may then send a scheduling request (SR) to indicate the start of a new talk burst. Semi-Persistent Scheduling (SPS) with SR Masking (timer set to, for example, 600 ms) can be used to prevent the access terminal from sending an SR for VoIP packets after the access terminal has entered the talk state. The base station (e.g., eNodeB 202-210 in LTE or a gNodeB in 5G NR) can recognize the entry of the access terminal into a Listen/Silence period and remove the SR masking.

The first SID of a Listen/Silence period is transmitted as a SID_FIRST frame. A first SID_UPDATE frame can be sent three frames after the SID_FIRST frame, and thereafter a SID_UPDATE frame can be sent every eighth frame. SID_UPDATE frames are sent for updating the comfort noise (CN). SID_UPDATE frames carry information on background noise and Codec Mode Request (CMR) bits for rate adaptation.

Figure 5:
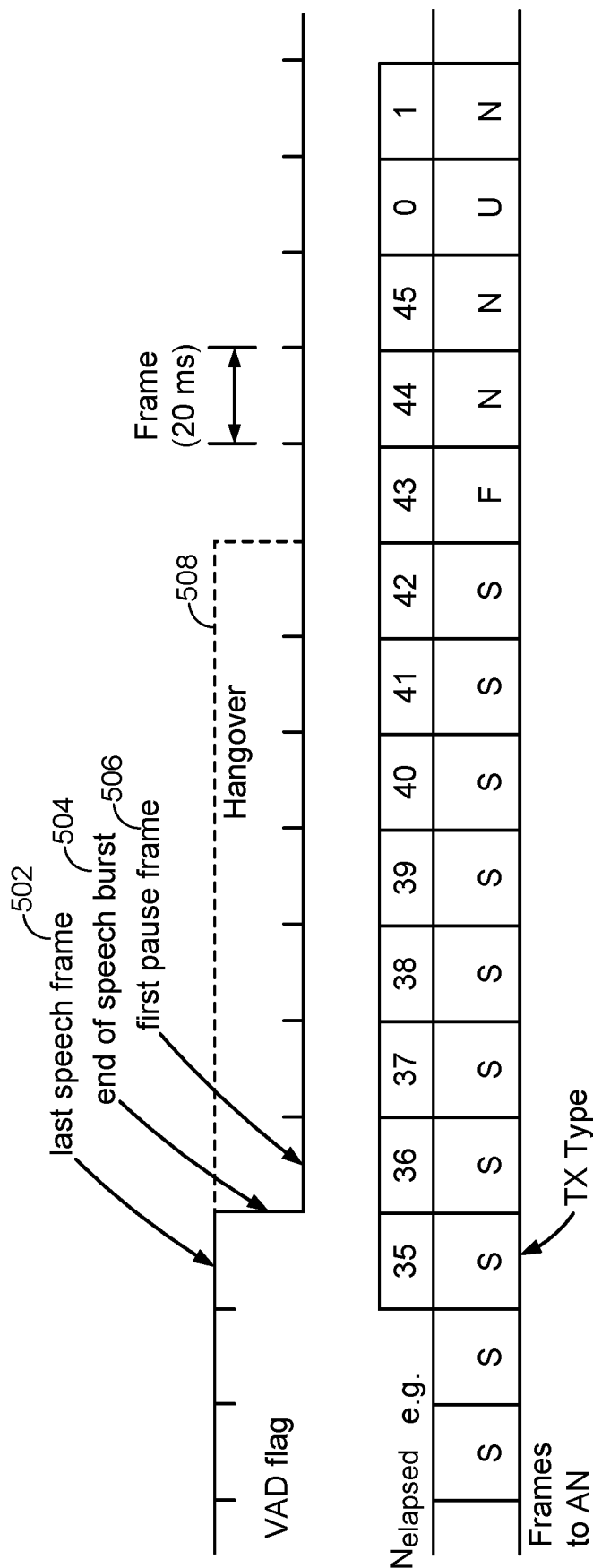
FIG. 5 illustrates an exemplary sequence of voice and silence indicator (SID) frames for a voice call according to at least one aspect of the disclosure.

FIG. 5 illustrates an exemplary sequence 500 of voice and SID frames for a voice call according to at least one aspect of the disclosure. As shown in FIG. 5, the sequence 500 includes a last speech frame 502, an end of the speech burst 504, and a first pause frame 506. The frames illustrated in FIG. 5 are uplink frames to the base station and may have a transmission type of Speech (S), SID_FIRST (F), SID_UPDATE (U), or No Data (N). In FIG. 5, $N_{elapsed}$ is the number of elapsed frames since the last SID_UPDATE. As shown in FIG. 5, due to latency, speech (S) frames continue after the end of the speech burst 504 for a hangover period 508. At the end of the hangover period 508, the access terminal sends a SID_FIRST (F) frame followed by two No Data (N) frames. The access terminal then sends a SID_UPDATE (U) frame, and $N_{elapsed}$ resets to 0.

The base station should recognize the silence period beginning after the hangover period 508 when it receives the SID_FIRST (F) frame or the SID_UPDATE (U) frame. The base station should then provide synchronized grants with the 160 ms duration to prevent the access terminal from sending an SR to send the SID packets (note that the terms "packets" and "frames" are used interchangeably herein).

The disclosure relates to optimized uplink operation for VoIP and VoNR Listen/Silence periods. For example, rather than transmit SID_UPDATE frames on the uplink every 160 ms, the access terminal can group SID_UPDATE frames into bundles and periodically transmit a bundle of SID_UPDATE frames to the base station.

More specifically, it can be assumed that the access terminal will be in the Listen/Silence state for three to five seconds. Thus, in an aspect, when the access terminal enters the Listen/Silence state, it can record background noise samples and generate multiple SID packets (e.g., both the SID_FIRST frame and multiple SID_UPDATE frames) using the recorded background noise samples. The SID_FIRST frame for the Listen/Silence state can be bundled with the final active speech frame(s) of the previous talk burst (e.g., one or more frames of the hangover period 508), and the multiple SID_UPDATE frames can be bundled together, as they will contain the same background noise coefficients. The Real-time Transport Protocol (RTP) timestamp and sequence number should be incremented for each SID packet so that the receiver generates No Data frames between the SID_UPDATE frames. Alternatively, out of band signaling (e.g., Media Access Control (MAC) Control Element (CE)) between the access terminal and the base station can provide the RTP sequence number and timestamp pair.

In an aspect, when the access terminal senses an update to the comfort noise or an update in CMR, the access terminal can send another bundle of SID_UPDATE frames. This can be independent of the 160 ms schedule, but the base station can still maintain the 160 ms schedule. That is, the access terminal can send the new bundle of SID_UPDATE frames when it detects the change in comfort noise or CMR, but the base station will continue to follow the 160 ms schedule.

Given that there may be end-to-end encryption and the RTP sequence number space should be managed end-to-end, the sending access terminal should prepare the SID packets (whether SID_FIRST or SID_UPDATE frames); they should not be auto-generated by the base station. The access terminal can prepare, for example, 20 samples (where 160 ms*20=3.2 secs) and send these to the base station with the appropriate RTP sequence numbers.

A SID bundle (whether the SID_FIRST frame and the final active speech frame(s) of the previous talk burst, the SID_FIRST frame and one or more SID_UPDATE frames, or multiple SID_UPDATE frames) can be sent to the base station in a single transmission. In an aspect, the size of a SID bundle may be determined based on the channel conditions. For example, the size of a SID bundle may be based on the number of SID packets that can be reliably carried on the channel in, for example, a single MAC packet. Alternatively, or additionally, the size of a SID bundle may be determined heuristically based on average speech and silence patterns for the average human, and subsequently, the average speech and silence pattern of the user as the access terminal learns the user's speech and silence patterns. For example, if the user is typically silent for 2.5 seconds at a time and the channel conditions permit, the access terminal can send 2.5 seconds of SID packets in a single transmission.

In an aspect, the link liveliness between the access terminal and the base station can be maintained using Channel State Information (CSI) reports and downlink traffic Hybrid Automatic Repeat Request (HARQ) acknowledgments (ACKs)/negative acknowledgements (NACKs). Knowing that the access terminal is still active, the base station releases a SID packet (whether the SID_FIRST frame or a SID_UPDATE frame) in order every 160 ms from the received SID bundle. For the base station to process the SID packet, independent Packet Data Convergence Protocol (PDCP) sequence numbers should be applied to each SID packet in the bundle.

In an aspect, if the silence period extends beyond the 3.2 seconds, the access terminal can send another bundle of SID frames. However, the size of the next SID bundle may be smaller, with the expectation that there will be a shorter amount of time left in the Listen/Silence state. The size of the next SID bundle can be determined heuristically based on previous user behavior (e.g., typical length of silence periods).

In an aspect, if the access terminal is at a cell edge, it may be better for the access terminal to wake up every 160 ms to send the SID_UPDATE frame. In this case, the access terminal simply falls back to the conventional mode of operation. Alternatively, the access terminal could send smaller bundles of SID frames, based on the channel conditions.

Figure 6:
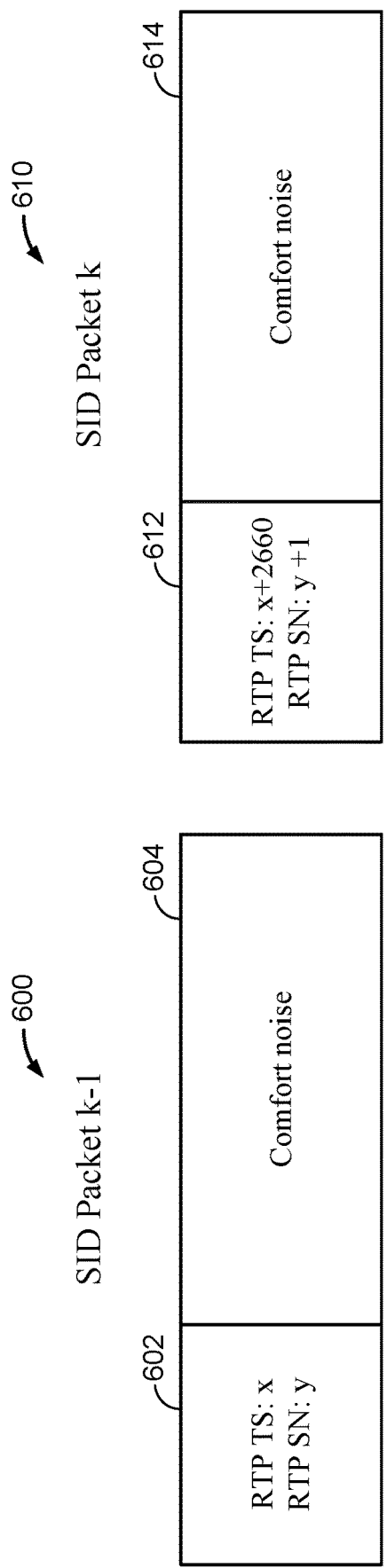
FIG. 6 illustrates exemplary Adaptive Multi-Rate Wideband (AMR-WB) SID packets having Real-time Transport Protocol (RTP) timestamps and sequence numbers, according to at least one aspect of the disclosure.

FIG. 6 illustrates exemplary Adaptive Multi-Rate Wideband (AMR-WB) SID packets having RTP timestamps and sequence numbers, according to at least one aspect of the disclosure. In the example of FIG. 6, a first SID packet 600 (numbered k−1) includes a header 602 and payload 604, and a second SID packet 610 (numbered k) includes a header 612 and payload 614. The payload 604 includes a sample of background noise recorded by the access terminal as comfort noise. The payload 614 also includes a sample of background noise recorded by the access terminal as comfort noise. Both samples may be the same recorded sample.

In an aspect, the RTP timestamp (TS) of the SID packets 600 and 610 will increase by 160 and 320 for AMR and AMR-WB, respectively, based on the sampling clock rate of the access terminal. The sequence number (SN) will increment by one for each RTP packet 600 and 610. The RTP timestamp is detrmined by adding the transmit time (i.e., timestamp) of the previous packet and the RTP timestamp increments with respect to the previous packet, as given by the formula:

$$TS(n)=TS(n-1)+T_{RTP}(T_{RTP}(n)-T_{RTP}(n-1)),$$

where $T_{RTP}$ is the timestamp value of the RTP packet converted into millisecond units.

In case of AMR-WB SID packets, the sequence number will be incremented sequentially and the RTP timestamp will be based on the clock rate of 320. The RTP timestamp of subsequent packets will be incremented by 2560 with respect to the previous packet. Thus, in the example of FIG. 6, the RTP timestamp of SID packet 600 is x and the RTP sequency number is y. The RTP timestamp of SID packet 610 is x+2560 and the RTP sequency number is y+1.

In an aspect, when the access terminal reenters the Talk state, it can discard the remaining SID packets (i.e., SID packets that have been generated but not transmitted) and stop forwarding the bundles of SID packets to the base station. The access terminal can use the RTP sequence number and RTP timestamp of the discarded SID packets for the RTP voice packets of the new talk burst. The access terminal may locally track the RTP sequence number and timestamp schedule, and, when the Listen/Silence state is interrupted, the access terminal can send the packet with the right sequence number per the access terminal's timestamp schedule. The base station and/or access terminal can discard any unsent SID_UPDATE frames. Alternatively, the access terminal can send out-of-band signalling over control plane signalling (e.g., a MAC CE) to the base station when the new talk burst is being packetized (voice packetization may have a delay of approximtely 20-40 ms).

Figure 7:
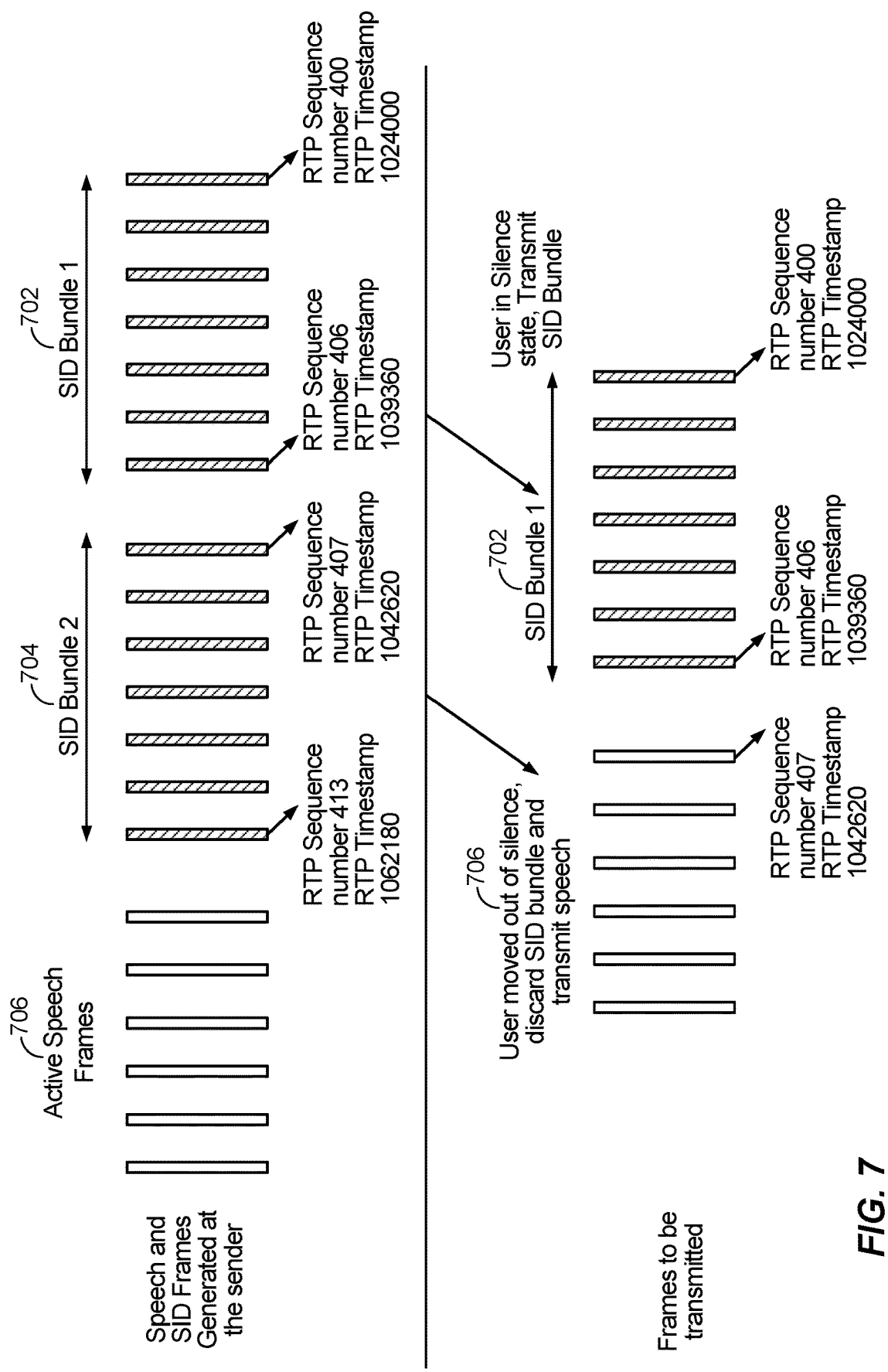
FIG. 7 illustrates an example of discarding SID_UPDATE frames and transmitting speech packets when the access terminal re-enters the Talk state according to an aspect of the disclosure.

FIG. 7 illustrates an example of discarding SID_UPDATE frames and transmitting speech packets when the access terminal re-enters the Talk state according to an aspect of the disclosure. As shown in FIG. 7, the access terminal generates a first bundle 702 of SID_UPDATE frames, a second bundle 704 of SID_UPDATE frames, and a group of speech frames 706. In the example of FIG. 7, the first SID_UPDATE frame in the first bundle 702 has an RTP sequence number of 400 and a timestamp of 1024000, and the last SID_UPDATE frame in the first bundle 702 has an RTP sequence number of 406 (because there are seven SID_UPDATE frames in the first bundle 702) and a timestamp of 1039360. The first SID_UPDATE frame in the second bundle 704 has an RTP sequence number of 407 and a timestamp of 1042620, and the last SID_UPDATE frame in the first bundle 704 has an RTP sequence number of 413 (because there are seven SID_UPDATE frames in the second bundle 704) and a timestamp of 1062180.

In the example of FIG. 7, the access terminal re-enters the Talk state and generates the group of speech frames 706 before the second bundle 704 of SID_UPDATE frames is transmitted to the base station. As such, the access terminal discards the second bundle 704 of SID_UPDATE frames and assigns the RTP sequence number of 407 and timestamp of U.S. Pat. No. 1,042,620 to the first speech frame. The access terminal then numbers the remaining speech packets as usual.

As will be appreciated, although FIG. 7 was described in terms of operations of the access terminal, the base station may receive the first bundle 702 and the second bundle 704 of SIP_UPDATE frames from the access terminal and, upon receipt of the group of speech frames, discard the second bundle 704 of SIP_UPDATE frames.

In an aspect, the access terminal can negotiate the capability to bundle SID packets with the base station and activate it only when supported by both parties. This negotiation may have to be done with each base station handover to ensure that there are no out-of-sync issues. In an aspect, the access terminal may include its capability to bundle SID packets along with the Resource Radio Control (RRC) message (e.g., the RRC Reconfiguration message) as part of the handover messaging.

Figure 8:
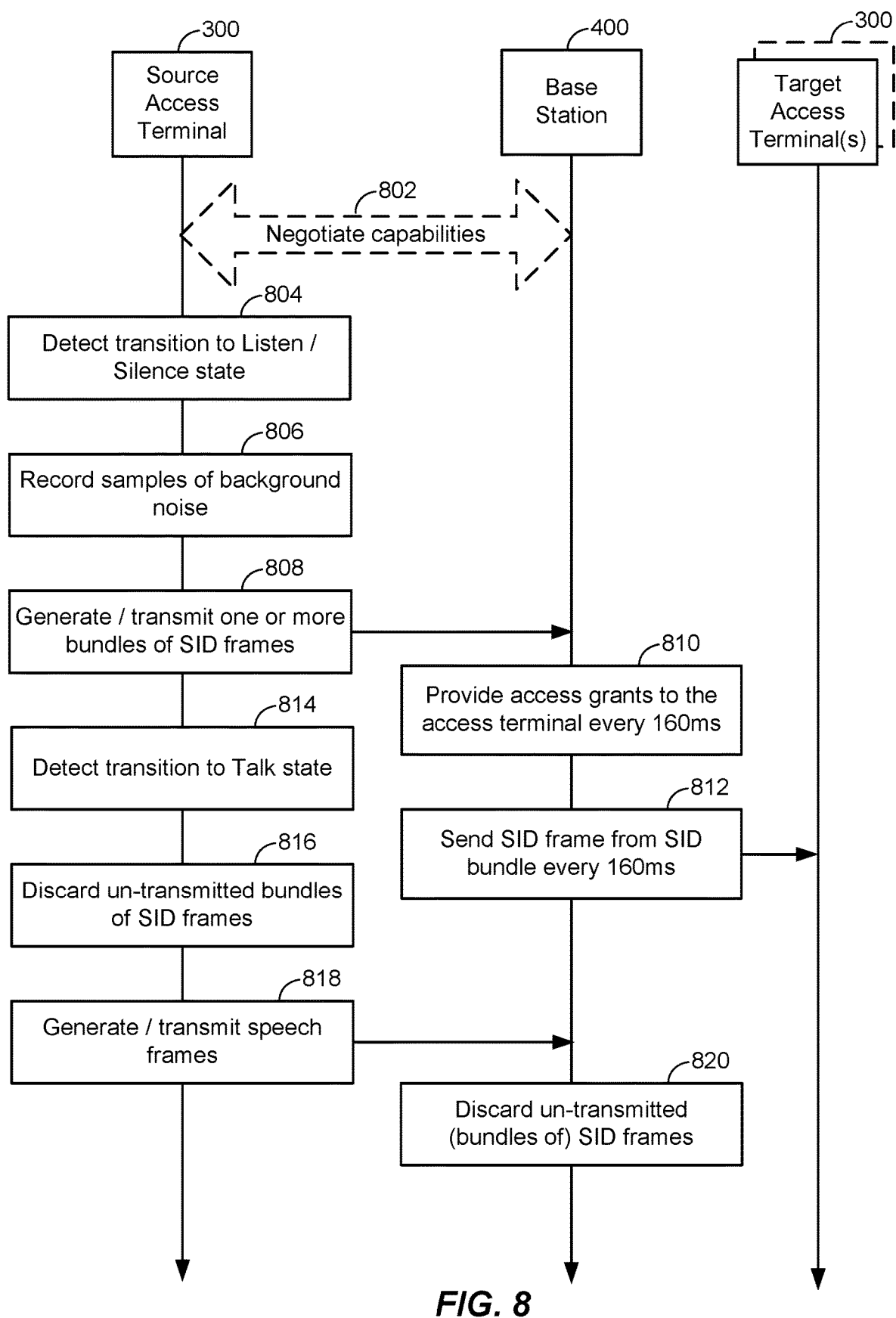
FIG. 8 illustrates an exemplary flow for transmitting bundles of SID frames during a voice call among a plurality of access terminals according to an aspect of the disclosure.

FIG. 8 illustrates an exemplary flow for transmitting bundles of SID frames during a voice call among a plurality of access terminals according to an aspect of the disclosure. In the example of FIG. 8, a source access terminal 300 is partcipating in the voice call with one or more target access terminals 300. At 802, the source access terminal 300 optionally negotiates its capabilities to generate and transmit bundles of SID packets with its serving base station 400. If both the source access terminal 300 and the base station 400 support bundling, the flow proceeds to 804, where the source access terminal 300 detects a transition from a Talk state to a Listen/Silence state.

At 806, in response to the detection at 804, the source access terminal 300 records samples of the background noise, and at 808, generates and transmits at least one bundle of SID packets (e.g., SID_UPDATE frames). Depending on the channel conditions and/or the (estimated) length of the Listen/Silence state, the source access terminal 300 can generate and transmit multiple bundles of SID packets, as described above.

At 810, the base station 400 provides an access grant to the source access terminal 300 for every 160 ms, corresponding to the times at which the source access terminal 300 would normally send a SID_UPDATE frame. For example, the source access terminal 300 can send bundles of SID frames based on channel conditions, and the base station 400 can provide synchronized grants with the 160 ms duration to prevent the source access terminal 300 from sending an SR to send the bundle of SID frames. At 812, the base station 400 sends a SID_UPDATE frame from the bundle of SID packets to the one or more target access terminals 300 every 160 ms. As will be appreciated, although the example of 160 ms is used, the base station can provide access grants to the source access terminal 300 and SID packets to the target access terminals 300 at whatever the SID transmission periodicity is for the given network protocol.

At 814, the source access terminal 300 detects a transition back to the Talk state, and, at 816, discards any un-transmitted bundles of SID frames. At 818, the source access terminal 300 generates and transmits speech frames for the new talk burst to the base station 400, which, at 820, upon receiving new speech frames, discards any un-transmitted bundles of SID frames and/or individual SID frames.

Figure 9:
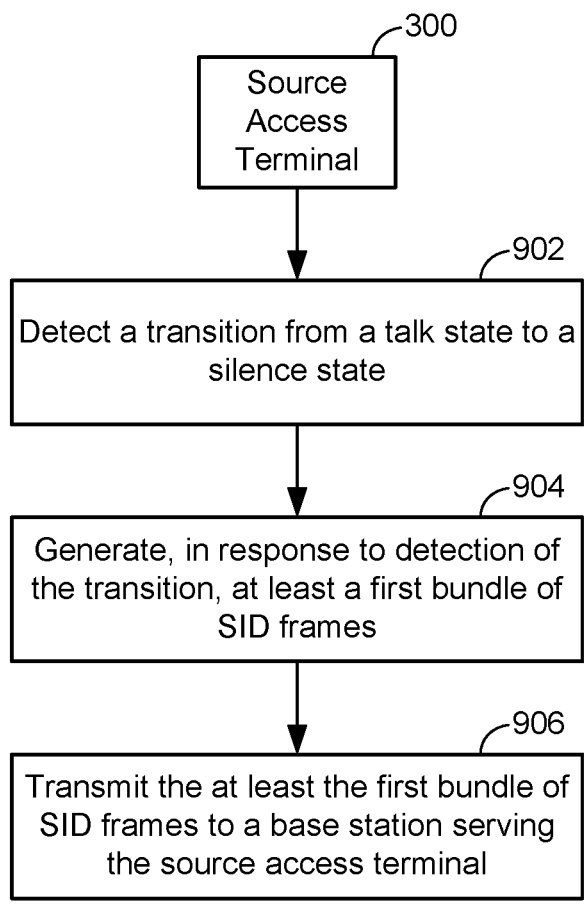
FIG. 9 illustrates an exemplary method for transmitting bundles of SID frames during a voice call among a plurality of access terminals according to at least one aspect of the disclosure.

FIG. 9 illustrates an exemplary method 900 of transmitting bundles of SID frames during a voice call among a plurality of access terminals according to at least one aspect of the disclosure. The method 900 may be performed by a source access terminal of the plurality of access terminals, such as access terminal 300. At 902, the source access terminal 300 (e.g., processor(s) 305) detects a transition from a talk state to a silence state, as at 804 of FIG. 8. At 904, in response to detection of the transition, the source access terminal 300 (e.g., processor(s) 305) generates at least a first bundle of SID frames, as at 808 of FIG. 8. In an aspect, each SID frame of the at least the first bundle of SID frames includes data representing comfort noise to be played at one or more target access terminals of the plurality of access terminals during the silence state. At 906, the source access terminal 300 (e.g., wireless communications interface 330) transmits the at least the first bundle of SID frames to a base station serving the source access terminal (e.g., base station 400), as at 808 of FIG. 8.

Figure 10:
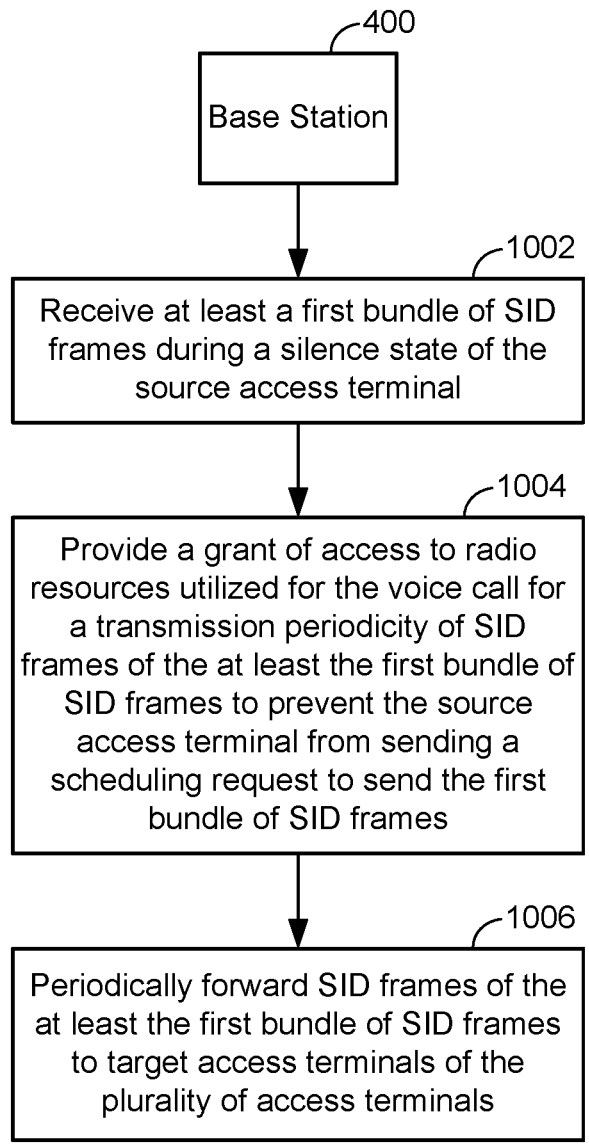
FIG. 10 illustrates an exemplary method for receiving bundles of SID frames during a voice call among a plurality of access terminals according to at least one aspect of the disclosure.

FIG. 10 illustrates an exemplary method 1000 of receiving bundles of SID frames during a voice call among a plurality of access terminals according to at least one aspect of the disclosure. The method 1000 may be performed by a base station (e.g., base station 400) serving a source access terminal (e.g., access terminal 300) of the plurality of access terminals. At 1002, the base station 400 (e.g., wireless communications interface 430) receives at least a first bundle of SID frames during a silence state of the source access terminal, as at 808 of FIG. 8. In an aspect, each SID frame of the at least the first bundle of SID frames includes data representing comfort noise to be played at one or more target access terminals of the plurality of access terminals during the silence state. At 1004, the base station 400 (e.g., processor(s) 405 via wireless communications interface 430) provides a grant of access to radio resources utilized for the voice call for a transmission periodicity of SID frames of the at least the first bundle of SID frames to prevent the source access terminal from sending a scheduling request to send the first bundle of SID frames, as at 810 of FIG. 8. At 1006. The base station 400 (e.g., processor(s) 405 via wireless communications interface 430) periodically forwards SID frames of the at least the first bundle of SID frames to target access terminals of the plurality of access terminals, as at 812 of FIG. 8.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of transmitting bundles of silence indicator (SID) frames during a voice call among a plurality of access terminals, comprising:
    detecting, by a source access terminal of the plurality of access terminals, a transition from a talk state to a silence state;
    in response to detection of the transition, generating, by the source access terminal, at least a first bundle of SID frames, wherein each SID frame of the at least the first bundle of SID frames includes data representing comfort noise to be played at one or more target access terminals of the plurality of access terminals during the silence state;
    transmitting, by the source access terminal, the at least the first bundle of SID frames to a base station serving the source access terminal;
    detecting, by the source access terminal, a transition from the silence state to the talk state; and
    in response to detection of the transition from the silence state to the talk state, discarding, by the source access terminal, remaining bundles of the at least the first bundle of SID frames that have not been transmitted to the base station.

2. The method of claim 1, further comprising:
    negotiating, by the source access terminal with the base station, to notify the base station that the source access terminal supports bundling of SID frames.

3. The method of claim 1, further comprising:
    recording, by the source access terminal, a sample of background noise of an environment of the source access terminal; and
    generating, by the source access terminal, the at least the first bundle of SID frames using the recorded sample of the background noise as the data representing the comfort noise.

4. The method of claim 3, further comprising:
    detecting, by the source access terminal, a change in the background noise of the environment of the source access terminal;

in response to detection of the change, recording, by the source access terminal, a new sample of the background noise of the environment of the source access terminal; and generating, by the source access terminal, at least one additional bundle of SID frames, wherein each SID frame of the at least one additional bundle of SID frames includes new data representing comfort noise to be played at the one or more target access terminals during the silence state, wherein the new sample of the background noise is used as the new data representing the comfort noise.

5. The method of claim 1, further comprising:
detecting, by the source access terminal, that a length of the silence state meets or exceeds a length of the at least the first bundle of SID frames; and
generating, by the source access terminal, at least one additional bundle of SID frames based on the length of the silence state meeting or exceeding the length of the at least the first bundle of SID frames.

6. The method of claim 5, wherein each SID frame of the at least the first bundle of SID frames and the at least one additional bundle of SID frames includes the same data representing the comfort noise to be played at the one or more target access terminals of the plurality of access terminals during the silence state.

7. The method of claim 1, further comprising:
receiving, at the source access terminal, a grant of access to radio resources utilized for the voice call for a transmission periodicity of SID frames of the at least the first bundle of SID frames.

8. The method of claim 7, wherein the periodicity of the SID frames comprises 160ms.

9. The method of claim 1, wherein the at least the first bundle of SID frames comprises a plurality of SID_UPDATE frames.

10. The method of claim 1, wherein each SID frame of the first bundle of SID frames includes data representing the same comfort noise.

11. The method of claim 1, wherein each SID frame of the at least the first bundle of SID frames is associated with a consecutive packet sequence number.

12. An apparatus configured to transmit bundles of silence indicator (SID) frames during a voice call among a plurality of access terminals, comprising:
a transceiver of a source access terminal of the plurality of access terminals; and
at least one processor of the source access terminal configured to:
detect a transition from a talk state to a silence state;
generate, in response to detection of the transition, at least a first bundle of SID frames, wherein each SID frame of the at least the first bundle of SID frames includes data representing comfort noise to be played at one or more target access terminals of the plurality of access terminals during the silence state;
cause the transceiver to transmit the at least the first bundle of SID frames to a base station serving the source access terminal;
detect a transition from the silence state to the talk state; and
discard, in response to detection of the transition from the silence state to the talk state, remaining bundles of the at least the first bundle of SID frames that have not been transmitted to the base station.

13. The apparatus of claim 12, wherein the at least one processor is further configured to:
record a sample of background noise of an environment of the source access terminal; and
generate the at least the first bundle of SID frames using the recorded sample of the background noise as the data representing the comfort noise.

14. The apparatus of claim 13, wherein the at least one processor is further configured to:
detect a change in the background noise of the environment of the source access terminal;
record, in response to detection of the change, a new sample of the background noise of the environment of the source access terminal; and
generate at least one additional bundle of SID frames, wherein each SID frame of the at least one additional bundle of SID frames includes new data representing comfort noise to be played at the one or more target access terminals during the silence state, wherein the new sample of the background noise is used as the new data representing the comfort noise.

15. The apparatus of claim 12, wherein the at least one processor is further configured to:
detect that a length of the silence state meets or exceeds a length of the at least the first bundle of SID frames; and
generate at least one additional bundle of SID frames based on the length of the silence state meeting or exceeding the length of the at least the first bundle of SID frames.

16. The apparatus of claim 12, wherein the transceiver is configured to:
receive a grant of access to radio resources utilized for the voice call for a transmission periodicity of SID frames of the at least the first bundle of SID frames.

17. The apparatus of claim 12, wherein each SID frame of the first bundle of SID frames includes data representing the same comfort noise.

18. The apparatus of claim 12, wherein each SID frame of the at least the first bundle of SID frames is associated with a consecutive packet sequence number.

\* \* \* \* \*